United States Patent
Morita et al.

(10) Patent No.: US 6,745,528 B2
(45) Date of Patent: Jun. 8, 2004

(54) STAINLESS-STEEL FLOOR AND METHOD OF CONSTRUCTING THE STAINLESS-STEEL FLOOR

(75) Inventors: Mitsuru Morita, Tokyo (JP); Yuichi Izaki, Tokyo (JP); Akio Tomita, Tokyo (JP); Hiroshi Imai, Tokyo (JP); Kansuke Honma, Tokyo (JP); Hideyuki Meguro, Tokyo (JP); Katsumi Kawamoto, Tokyo (JP); Norihiro Nagao, Tokyo (JP); Nobutaka Sugano, Minamisaitama-gun (JP); Kyoya Tanaka, Kitasoma-gun (JP); Osamu Takesita, Ichikawa (JP); Naoaki Hamada, Ageo (JP)

(73) Assignee: Kajima Corporation, Tokyo (JP)

( * ) Notice: Subject to any disclaimer, the term of this patent is extended or adjusted under 35 U.S.C. 154(b) by 22 days.

(21) Appl. No.: 10/163,513

(22) Filed: Jun. 7, 2002

(65) Prior Publication Data

US 2003/0226333 A1 Dec. 11, 2003

(51) Int. Cl.$^7$ .............................. E04B 1/00; E04B 2/00; E06B 3/54
(52) U.S. Cl. .......................... 52/263; 52/480; 52/506.01
(58) Field of Search .............................. 156/71; 264/235, 264/275, 271.1; 52/263, 506.01, 742.13, 742.14, 742.15, 742.16, 506.06, 220.3, 480, 126.5, 126.6, 403.1

(56) References Cited

U.S. PATENT DOCUMENTS

| | | | | |
|---|---|---|---|---|
| 2,116,654 A | * | 5/1938 | Barge | 52/402 |
| 3,047,650 A | * | 7/1962 | Reiland | 174/49 |
| 3,122,073 A | * | 2/1964 | Masse | 52/515 |
| 3,303,264 A | * | 2/1967 | Saul | 174/48 |
| 4,360,993 A | * | 11/1982 | Tomokazu et al. | 52/365 |
| 4,458,458 A | * | 7/1984 | Orii | 52/173.1 |
| 4,644,720 A | * | 2/1987 | Schneider | 52/392 |
| 4,755,630 A | * | 7/1988 | Smith et al. | 174/35 MS |
| 4,823,523 A | * | 4/1989 | Coupard et al. | 52/3 |
| 4,930,280 A | * | 6/1990 | Abendroth | 52/403.1 |
| 4,945,697 A | * | 8/1990 | Ott et al. | 52/403.1 |
| 4,995,210 A | * | 2/1991 | Niese et al. | 52/391 |
| 5,369,927 A | * | 12/1994 | Counihan | 52/403.1 |
| 5,894,003 A | * | 4/1999 | Lockwood | 264/36.19 |
| 6,088,950 A | * | 7/2000 | Jones | 43/124 |
| 6,164,031 A | * | 12/2000 | Counihan | 52/480 |
| 6,220,523 B1 | * | 4/2001 | Fiedrich | 237/69 |
| 6,419,774 B1 | * | 7/2002 | Clifford | 156/71 |
| 6,626,264 B1 | * | 9/2003 | Christen | 181/290 |

FOREIGN PATENT DOCUMENTS

| | | |
|---|---|---|
| JP | 6-330605 | 11/1994 |
| JP | 7-21891 | 4/1995 |
| JP | 2000-291193 | 10/2000 |

* cited by examiner

*Primary Examiner*—Carl D. Friedman
*Assistant Examiner*—Kevin McDermott
(74) *Attorney, Agent, or Firm*—Oblon, Spivak, McClelland, Maier & Neustadt, P.C.

(57) ABSTRACT

A method of constructing a stainless-steel floor on a floor bed includes providing support members on the floor bed, placing a stainless-steel plate on the support members; and bonding the stainless-steel plate to the floor bed by using mortar to fill the space between the stainless-steel plate and the floor bed, or by using adhesive.

4 Claims, 10 Drawing Sheets

STAINLESS-STEEL FLOOR AND METHOD OF CONSTRUCTING THE STAINLESS-STEEL FLOOR

BACKGROUND OF THE INVENTION

1. Field of the Invention

The present invention relates to a stainless-steel floor constructed on a floor bed, and to a method of constructing the stainless-steel floor.

2. Description of the Prior Art

Floors used in food and pharmaceutical factories, research laboratories and other such facilities are required to have various properties, such as wear resistance, heat resistance, resistance to chemicals, water resistance, resistance to microorganisms, and to be antifungal and odorless. To achieve this, the floor material is given a finish coating of a material having the required resistance properties.

However, coated floors require time and effort, in addition to which because of the rigorous conditions under which the floors are used, floor coatings tend to readily blister, peel and crack, and therefore need to be repaired every some years. For this reason, recently stainless-steel plates are being used instead of such floor coatings.

To use stainless-steel plates for flooring, concrete is first poured beforehand. Then, afterwards, the stainless-steel plates are placed on the concrete bed and welded together, plate by plate. Thus, the stainless-steel plates are not bonded to the concrete. A problem therefore has been that in order to ensure the strength of the floor, the stainless-steel plates have to be 4 to 6 mm thick, which increases the cost. Another problem is that using thicker stainless-steel plates makes the floor position higher, which can hinder the opening and closing of doors. A further problem is that of the limited precision of the welds between the plates, which can result in a deterioration of the waterproof property of the floor.

In view of the foregoing, an object of the present invention is to provide a method of constructing a stainless-steel floor that enables the floor to be constructed at a low cost, does not raise the position of the floor and ensures that the floor is adequately waterproof, and to provide a stainless-steel floor.

SUMMARY OF THE INVENTION

To attain the above object, the present invention provides a method of constructing a stainless-steel floor on a floor bed, comprising the steps of placing a plurality of support members at predetermined positions on the floor bed, placing a stainless-steel plate on the plurality of support members, and supplying a material that bonds the stainless-steel plate to the floor bed into a space formed between the floor bed and the stainless-steel plate.

The above construction method can include a step of providing a leakage-prevention member between an outer edge of a lower surface of the stainless-steel plate and the floor bed to prevent leakage of the material supplied between the floor bed and the stainless-steel plate.

The above construction method can include a step of disposing a supply hose in the space between the floor bed and the stainless-steel plate, and a step of supplying a filler material from one end of the hose into the space to bond the stainless-steel plate to the floor bed. A groove can be formed at a predetermined position in the floor bed, and the hose is inserted into the groove. In such a case, it is preferable for the groove formed in the floor bed to be positioned along a central line of the stainless-steel plate or in the vicinity thereof.

The construction method can also include a step of inserting a nozzle of the hose in from one side towards an opposite side of the stainless-steel plate, and a step of withdrawing the hose back along the groove as the space is being filled from the opposite side of the stainless-steel plate.

The method also includes a step of using an adhesive to bond the stainless-steel plate to the floor bed by placing the adhesive at a predetermined position in the space formed between the floor bed and the stainless-steel plate, and a step of using a plurality of spreading-prevention members to enclose the adhesive. The adhesive enclosed by the plurality of support members can be placed in position when the support members are placed in position on the floor bed.

When a plurality of stainless steel plates are laid on the support members, it is preferable to insert caulking material between adjacent stainless-steel plates.

The above object is also attained by a stainless-steel floor, comprising support members located on a floor bed, a stainless-steel plate laid on the support members, and a filler material inserted into a space formed between the floor bed and the stainless-steel plate, that bonds the stainless-steel plate to the floor bed.

Instead of the above filler material, the stainless-steel plate can be bonded to the floor bed by an adhesive enclosed by spreading-prevention members.

The stainless-steel plate can be comprised of a box-shaped stainless-steel body open on one side, and concrete poured into the stainless-steel body. This is an economical way of constituting a floor, since the strength of the floor is maintained even if the thickness of the stainless-steel body is reduced. Moreover, laying the hose in a groove in the floor bed and withdrawing the hose as the space is being filled with the filler material makes it possible to construct a stainless-steel floor even when there are constraints on the height of the floor.

Further features of the invention, its nature and various advantages will be more apparent from the accompanying drawings and following detailed description of the invention.

DESCRIPTION OF THE PREFERRED EMBODIMENTS

Figure 1:
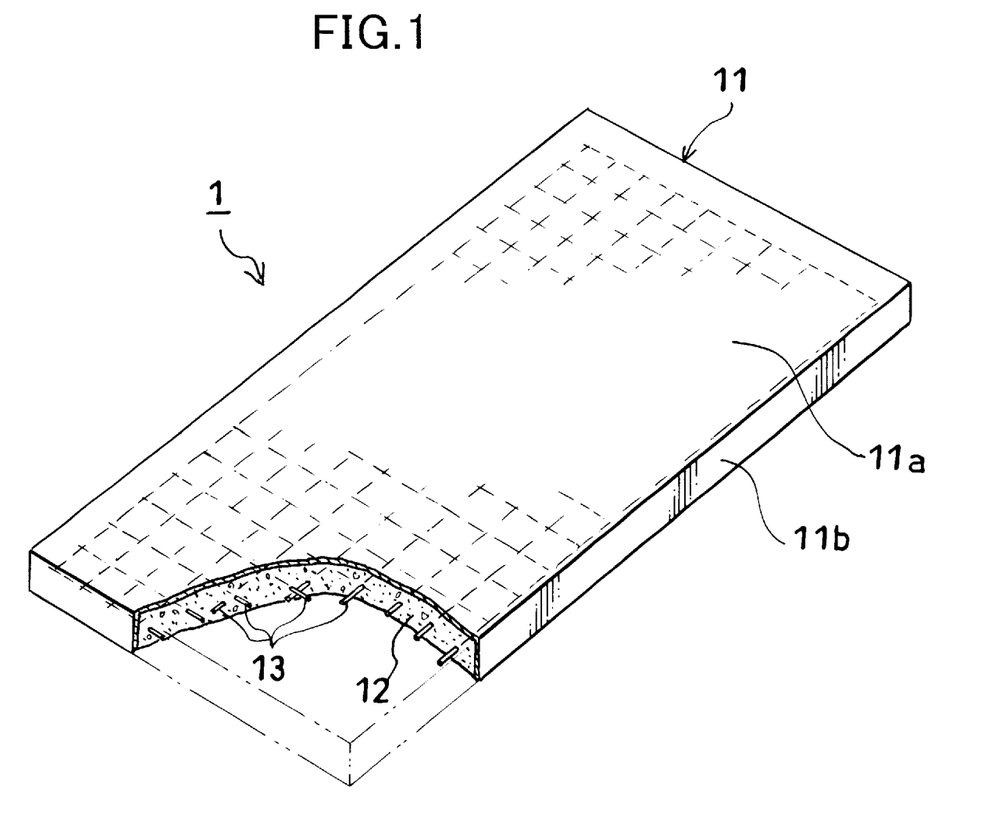
FIG. 1 is a perspective view showing an example of a structure of a stainless-steel plate used to construct a stainless-steel floor in accordance with the present invention.

FIG. 1 illustrates an example of the structure of a stainless-steel plate according to the present invention. In FIG. 1, the stainless-steel plate 1 of the invention is composed of a box-shaped stainless-steel plate body 11 open on one side, concrete 12 poured into the plate body 11, and strength-reinforcement steel bars 13 buried lengthwise and crosswise in the concrete 12. The plate body 11 is, for example, 3600 mm long and 1160 mm wide, having an upper wall 11a that is 1.5 mm thick and a peripheral wall 11b that is also 1.5 mm thick and 32 mm high. The plate body 11 is manufactured as a precast plate into which the concrete 12 is poured at the factory, and is then transported to the construction site.

A first embodiment of the method of constructing a stainless-steel floor 10 using the stainless-steel plates 1 will now be described, with reference to FIGS. 2 to 5.

Figure 2:
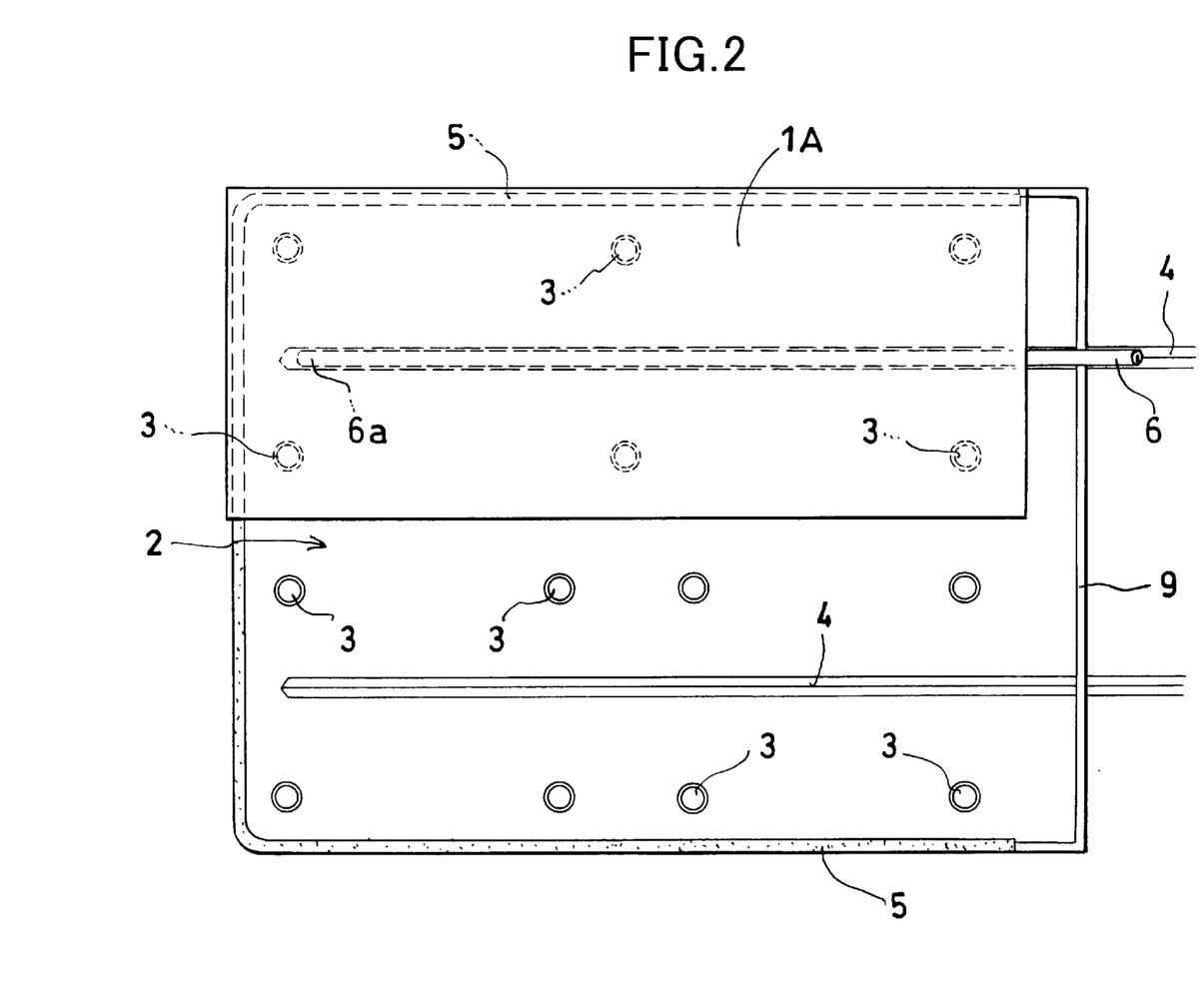
FIG. 2 is a plan view of a floor bed during construction of a stainless-steel floor in accordance with a first embodiment.
Figure 3:
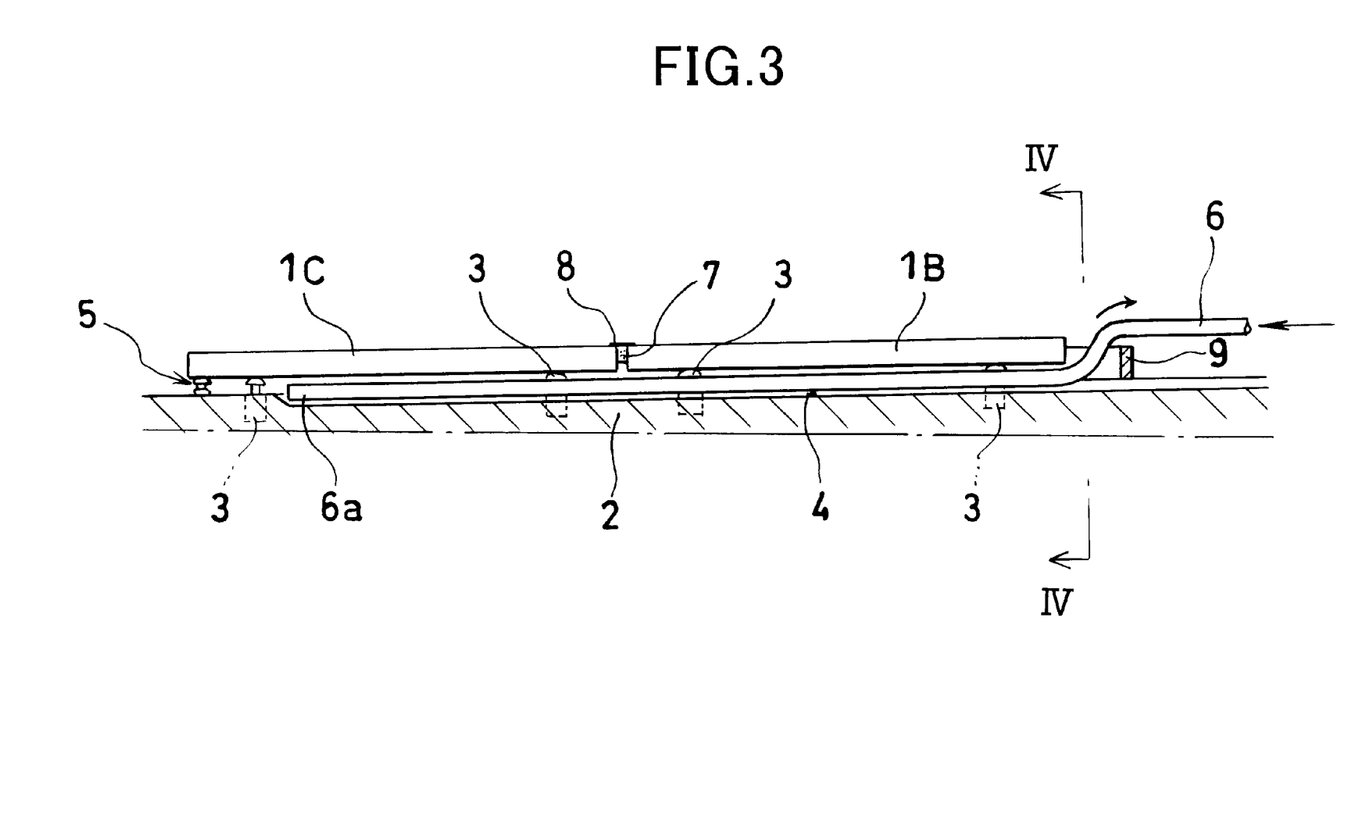
FIG. 3 is a side view of the first embodiment, showing when a space between the stainless-steel plate and the floor bed is charged with a filler material.
Figure 4:
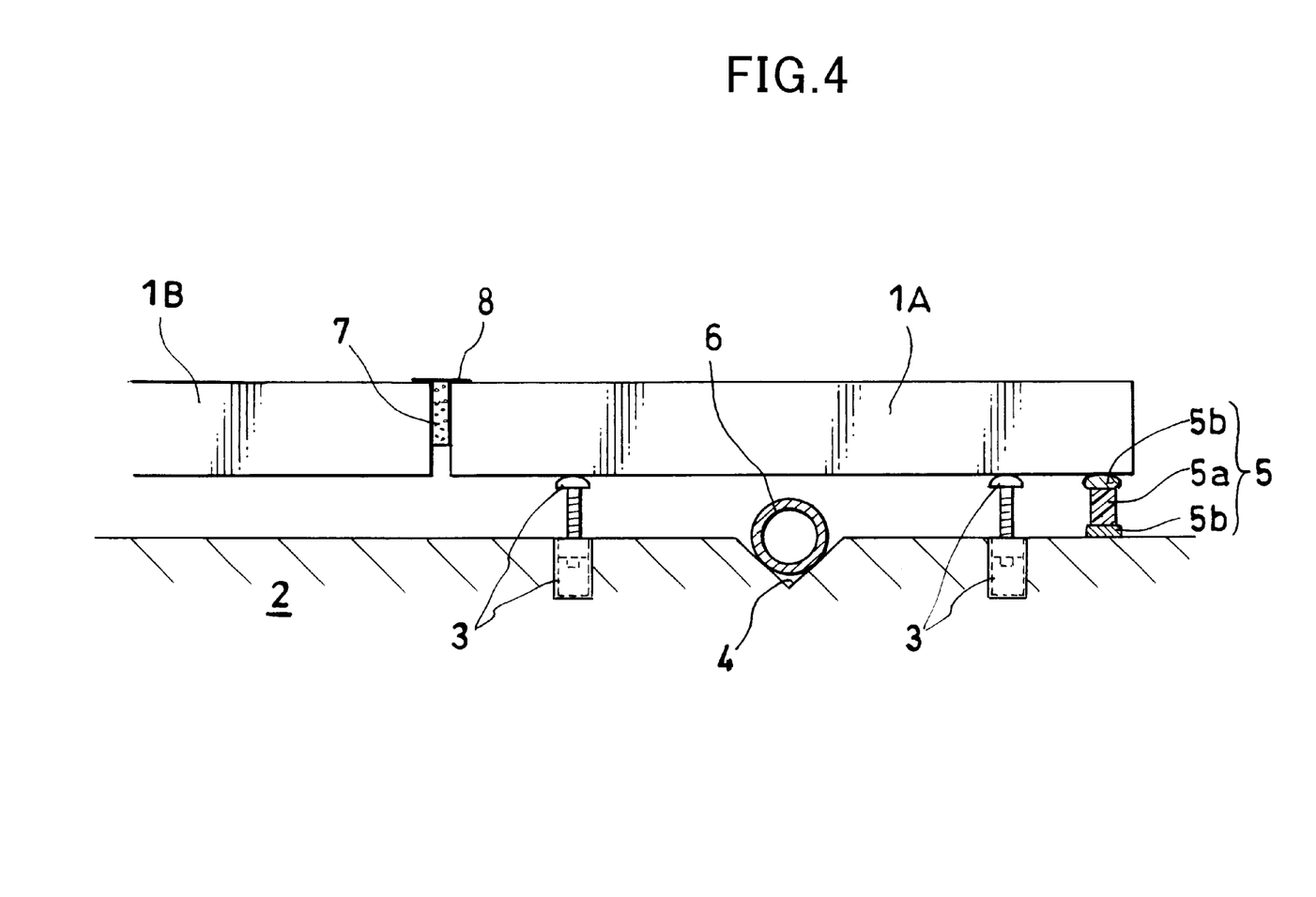
FIG. 4 is a cross-sectional view along line IV—IV of FIG. 3.
Figure 5:
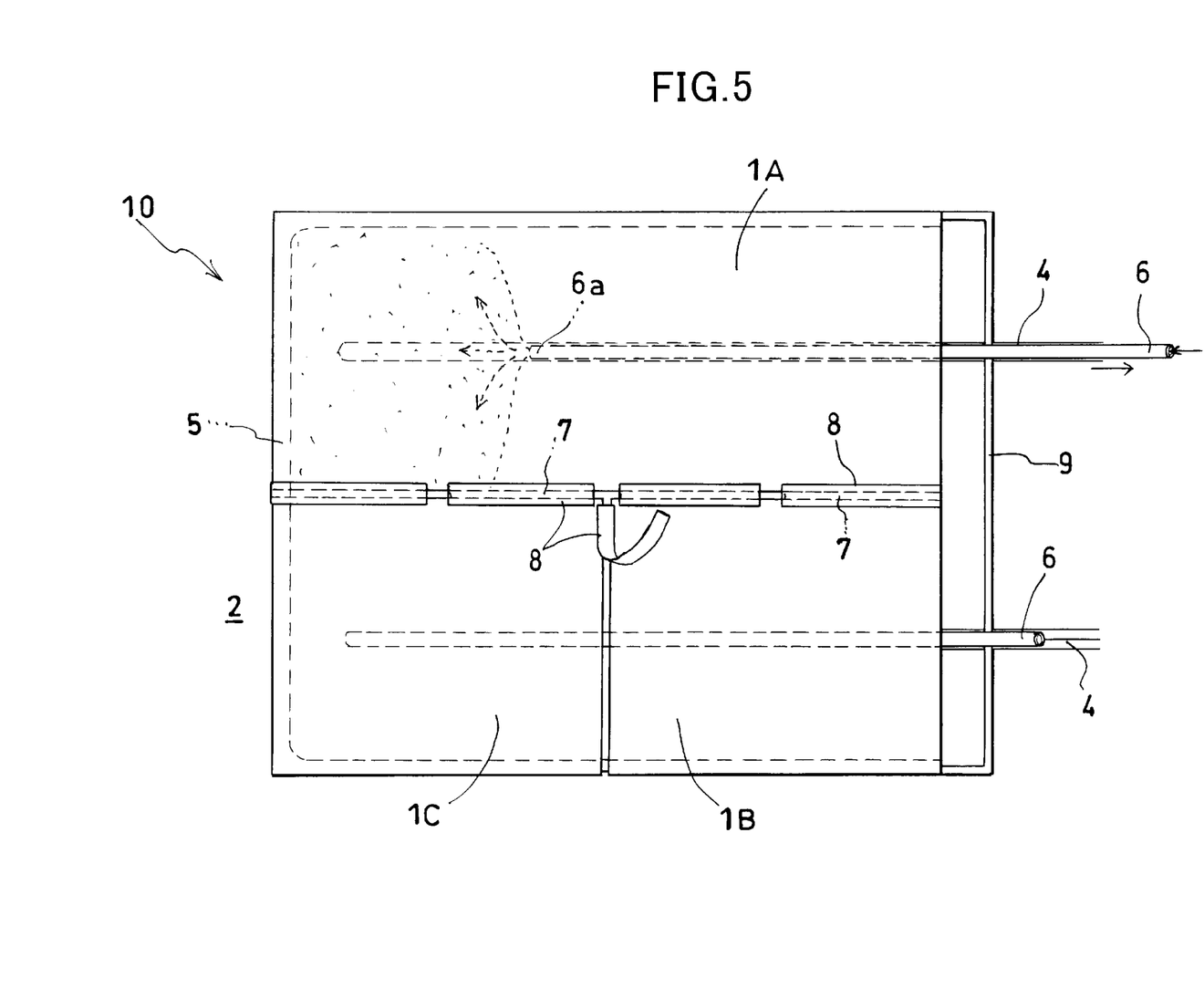
FIG. 5 is a plan view showing the stainless-steel floor in the process of being laid.

FIG. 2 is a view of the floor bed during construction of the stainless-steel floor, FIG. 3 is used to describe the charging of mortar, FIG. 4 is a cross-sectional view along line IV—IV of FIG. 3, and FIG. 5 shows the stainless-steel floor in the process of being laid. FIG. 5 shows an instance in which three stainless-steel plates 1A, 1B and 1C are laid on the floor bed 2 at the construction site. Stainless-steel plate 1A is twice as long as each of the stainless-steel plates 1B and 1C. Stainless-steel plates 1B and 1C have the same shape.

Before laying the stainless-steel plates 1A to 1C, support members 3 are affixed to the floor bed 2, as shown in FIG. 2, in alignment with the plates 1A to 1C. The support members 3 can be in-hole threaded anchor bolts, which can also be used to adjust the height of the floor plates. V-shaped or U-shaped grooves 4 are formed in the floor bed 2, with the grooves 4 being located so that they run below the central lines of the plates 1A to 1C. For example, the grooves 4 can start just short of one short side of the plates and finish just short of the opposite short side.

A leakage-prevention member 5 is provided around the periphery of the floor bed 2, corresponding in position to the outer edge of the stainless-steel plates 1A, 1B and 1C. The leakage-prevention member 5 is thus provided along the outer periphery of the stainless-steel floor 10 to be constructed, not along lower outer edges between adjacent stainless-steel plates or on lower outer edges along a short side of the plates. The leakage-prevention member 5 shown in FIG. 4 can be comprised, for example, of slender columnar backup material 5a formed of styrene foam in the shape of a square, to which sealing material 5b is bonded top and bottom.

A dam 9 is provided where a short end of the stainless-steel plates 1A, 1B and 1C is located, as shown in FIG. 5, to hold in mortar used to fill the space between the plates and the floor bed 2. The dam 9 has the same height as the stainless-steel plates 1A, 1B and 1C when laid on the support members 3.

After affixing the support members 3, forming the groove 4 and positioning the leakage-prevention member 5, a hose 6 is inserted into the groove 4 from one end, with the hose nozzle 6a facing the other end toward the other short side. When mortar is fed in, the hose 6 spans both of the plates 1B and 1C, as shown in FIG. 3. This enables the task of supplying the mortar to the plates 1B and 1C to proceed efficiently, without a break.

Then, the stainless-steel plates 1A, 1B and 1C are laid on the support members 3. As shown in FIGS. 4 and 5, styrene foam or other such backup material 7 is placed between the plates at prescribed intervals, and gum tape 8 is applied onto the upper surface of the backup material 7 and the plates 1A, 1B and 1C. A pump (not shown) is then used to pump in mortar filler (composed of a mixture of cement and an expansion agent, for example) through the hose 6. The mortar pumped from the hose nozzle 6a, held in by the leakage-prevention member 5, fills the space from one short side of the stainless-steel plates toward the other. The hose 6 is gradually withdrawn back along the groove 4 as the space is filled with the mortar. When enough mortar has been pumped in, it starts to rise up from between backup materials 7. When this happens, the hose 6 is withdrawn and moved to the next location.

When the hose is withdrawn until the nozzle 6a reaches the dam 9 and the area inside the dam 9 has been filled with enough mortar, the flow of mortar is stopped. The mortar is allowed to dry, then the gum tape 8 is peeled off, the backup material 7 is removed and caulking material is applied on top of the mortar showing in the gaps between the stainless-steel plates, filling the gaps. This completes the stainless-steel floor 10.

Thus, in accordance with this invention, the plate body 11 and concrete 12 constitute an integrated structure that is used to comprise the stainless-steel plates 1 (1A, 1B and 1C), and the space between the stainless-steel plates 1 and the floor bed 2 is filled with mortar. Therefore, the plate body 11 is bonded to the floor bed 2 via the concrete 12 and the mortar, ensuring that the floor is strong enough for its function, even if a thin plate body 11 is used. Stainless-steel is a costly material, so since this invention makes it possible to construct floors using less stainless-steel, the result is a lower-cost floor.

The support members 3 have to be higher than a hose 6 used on the floor bed 2 to pump in the mortar. However, in accordance with this invention, the hose 6 uses a groove 4, which makes it possible to reduce the height of the support members 3, which, combined with the ability to use thinner stainless-steel plates, enables the floor height to be further reduced. Thus, even when there is an existing limit on the floor height, such as in the case of interior renovations, it is still possible to build a stainless-steel floor without obstructing the opening and closing of doors.

The hose 6 is inserted from one short side up to the other, and is gradually withdrawn as the mortar is pumped in, so air in the space is driven out. This ensures the strength of the stainless-steel floor by preventing voids from forming in the mortar. The space is filled with mortar to the height of the dam 9 provided at one of the short sides, which amply allows for shrinkage as the mortar sets. This prevents a situation arising in which there is not enough mortar at one end of a stainless-steel plate 1. Gaps between stainless-steel plates 1 are caulked, making the floor waterproof, in contrast to the conventional construction method in which the plates are spot-welded together, which allows water to leak through between the welds.

While the foregoing explanation was made with reference to stainless-steel plates 1 that are precast plates prefabricated at the factory, the plates can instead be fabricated on-site by filling the plate body 11 with the concrete 12 at the site of the floor construction. Again, while the above-described stainless-steel plate 1 comprises a box-shaped stainless-steel plate body 11 with a filling of concrete 12, it can instead be constituted as a stainless-steel slab that is directly bonded to the floor bed by mortar.

The groove 4 is not limited to a V-shaped cross-section, but may be another shape, such as a square-channel cross-section. Also, the leakage-prevention member 5 does not have to be formed before the stainless-steel plates 1 are laid on the support members 3, but may instead be formed when the stainless-steel plates 1 are already in place on the support members 3. Similarly, the mortar does not have to be pumped in so that it gradually fills the space going from one short side to the other; instead the space can be filled going from one long side to the other. Again, the leakage-prevention member 5 has been described as provided around the periphery of the floor bed 2, corresponding in position to the outer edge of the stainless-steel plates 1A, 1B and 1C, to be disposed along the outer periphery of the stainless-steel floor 10, and not along the lower outer edges between adjacent stainless-steel plates or on the lower outer edges along a short side of the plates. However, the leakage-prevention member 5 can be provided on the lower outer edges between adjacent stainless-steel plates to fill the space with mortar on a plate-by-plate basis.

A second embodiment of the invention will now be described, with reference to FIGS. 6 and 7.

Figure 6:
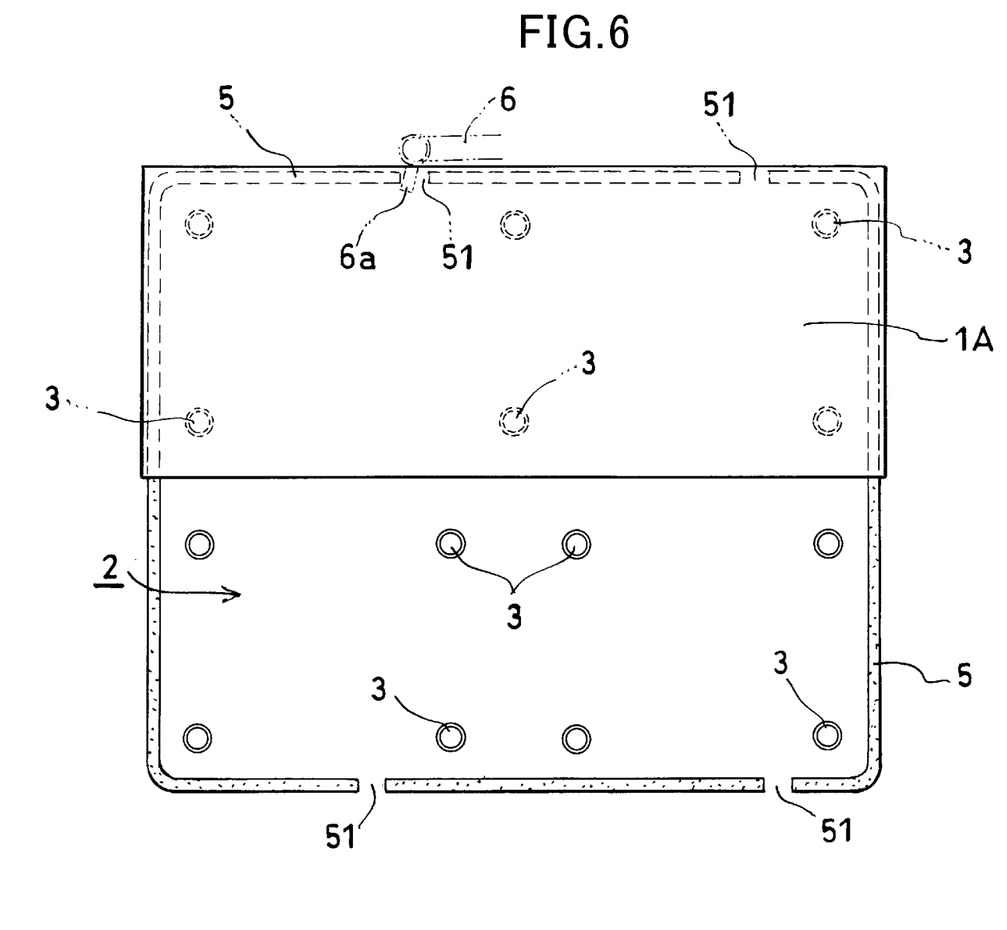
FIG. 6 is a plan view of a floor bed during construction of a stainless-steel floor in accordance with a second embodiment.
Figure 7:
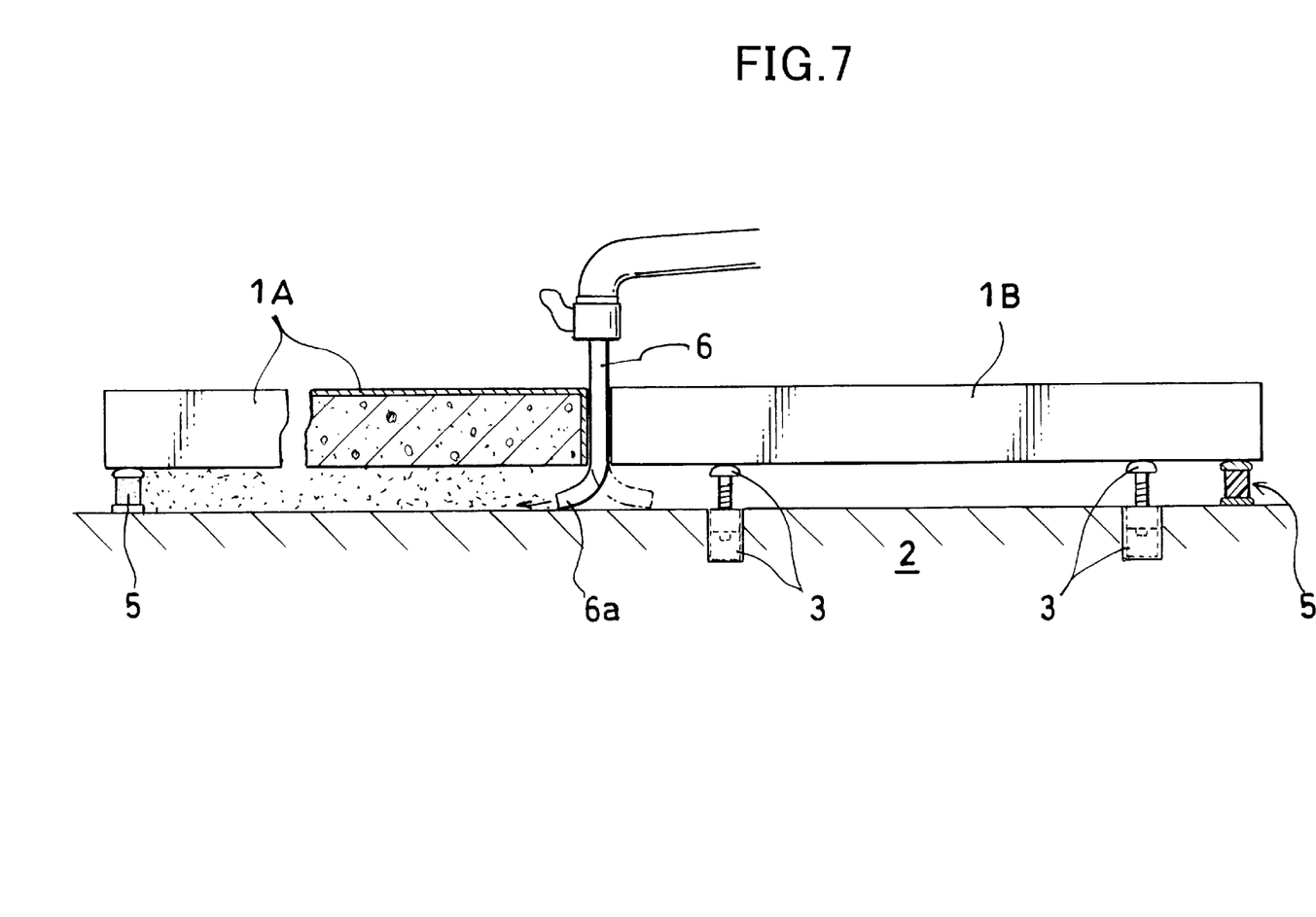
FIG. 7 is a side view of the second embodiment, showing when a space between the stainless-steel plate and the floor bed is being charged with a filler material.

FIG. 6 shows the floor bed during construction of a stainless-steel floor in accordance with the second embodiment, and FIG. 7 illustrates the insertion of the mortar. Parts and elements that are the same as those of the first embodiment have been given the same reference numerals, and further explanation thereof is omitted. A leakage-prevention member 5 is provided around the periphery of the floor bed 2, corresponding in position to the outer edge of the stainless-steel plates 1A, 1B and 1C. The leakage-prevention member 5 is provided along the entire periphery of the stainless-steel floor 10, but is not provided along the lower outer edges of adjacent stainless-steel plates. Openings 51 are provided in the leakage-prevention member 5 at set intervals. To pump in the mortar, the hose has a downward-pointing nozzle 6a that can be inserted into spaces between the plates 1A, 1B and 1C and into the openings 51. In this way, the space between the floor bed 2 and the stainless-steel plates 1A, 1B and 1C is filled with mortar. When enough mortar has been pumped in, the mortar comes up between the stainless-steel plates, at which point the hose nozzle 6a is moved to pump mortar in at another location.

As in the case of the first embodiment, the stainless-steel plates 1A, 1B and 1C are bonded to the floor bed 2, so the strength of the floor can be maintained even if the thickness of the plates is reduced. Doing this reduces the amount of stainless steel used, reducing the cost of the floor. Also, seams between plates are caulked, providing good waterproof properties, unlike in the case of conventional stainless-steel plate floors in which water can leak between the welds used to join plates together.

Since the downward-pointing nozzle 6a is used between the plates 1A, 1B and 1C or in the openings 51, it is not necessary to make the space between the plates and the bed high enough to allow insertion of the hose 6, so the height of the stainless-steel floor 10 can be decreased by reducing the height of the support members 3. Since only the nozzle 6a has to be inserted between the plates or in the openings 51 in the leakage-prevention member 5, it is simpler to construct the stainless-steel floor.

With the leakage-prevention member 5 being provided with the openings 51, sufficient mortar can be pumped into the space between the floor bed 2 and the plates 1A, 1B and 1C via the openings 51 and the gaps between the plates to ensure that the mortar does not contain voids, thereby ensuring the strength of the stainless-steel floor.

Figure 9:
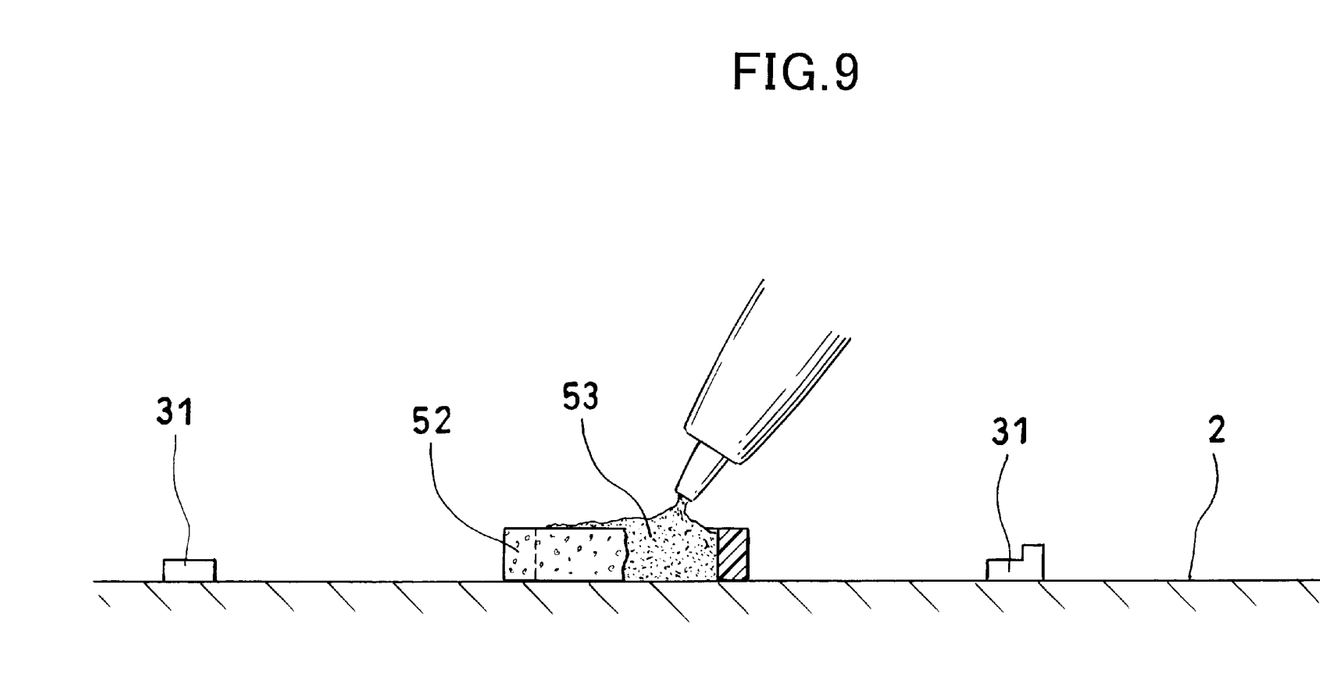
FIG. 9 is a side view of the third embodiment, showing when an adhesive is applied to the floor bed.
Figure 10:
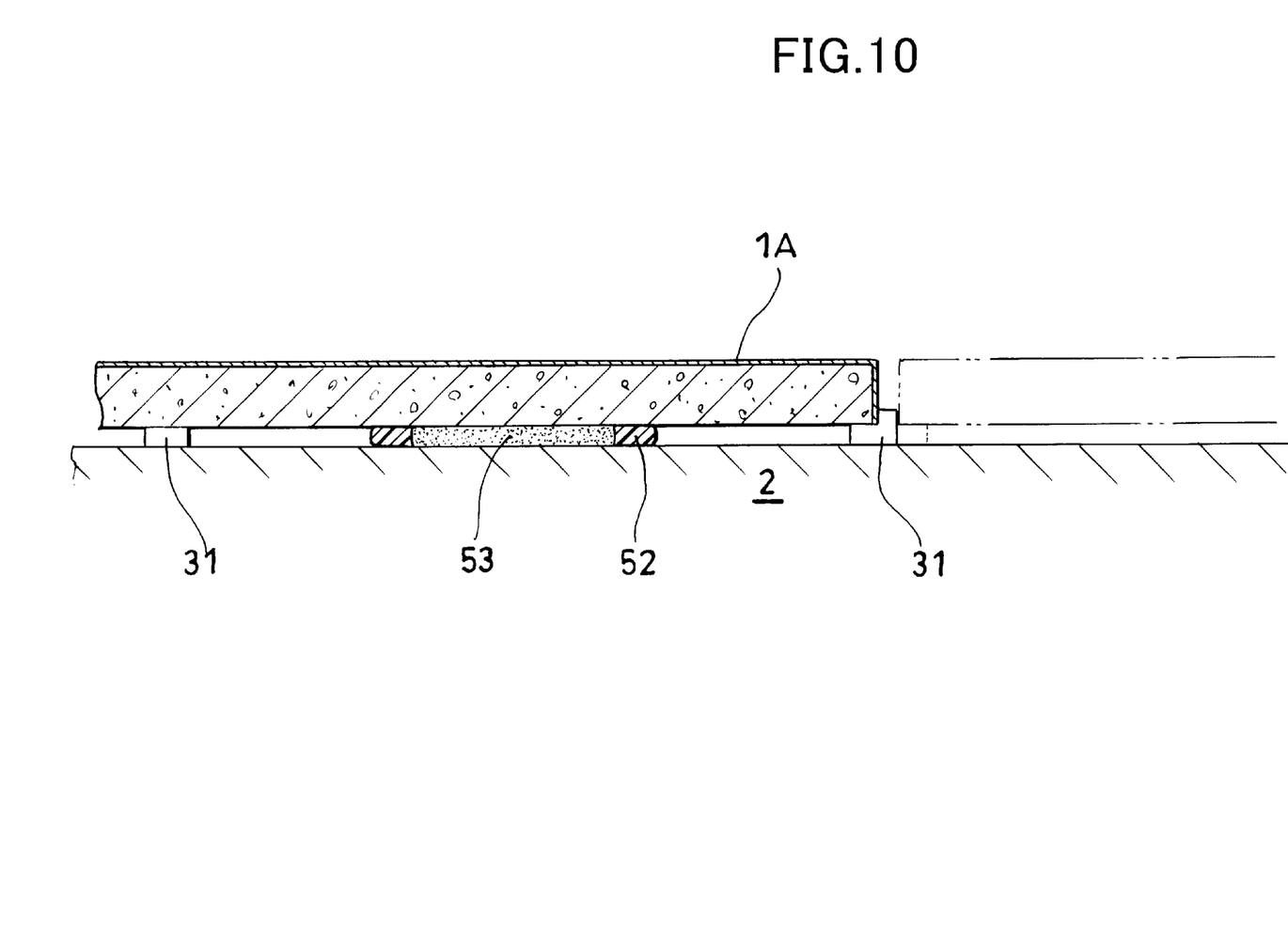
FIG. 10 is a cross-sectional view of the stainless-steel floor of the third embodiment, after construction.

A third embodiment will now be described with reference to FIGS. 8, 9 and 10.

Figure 8:
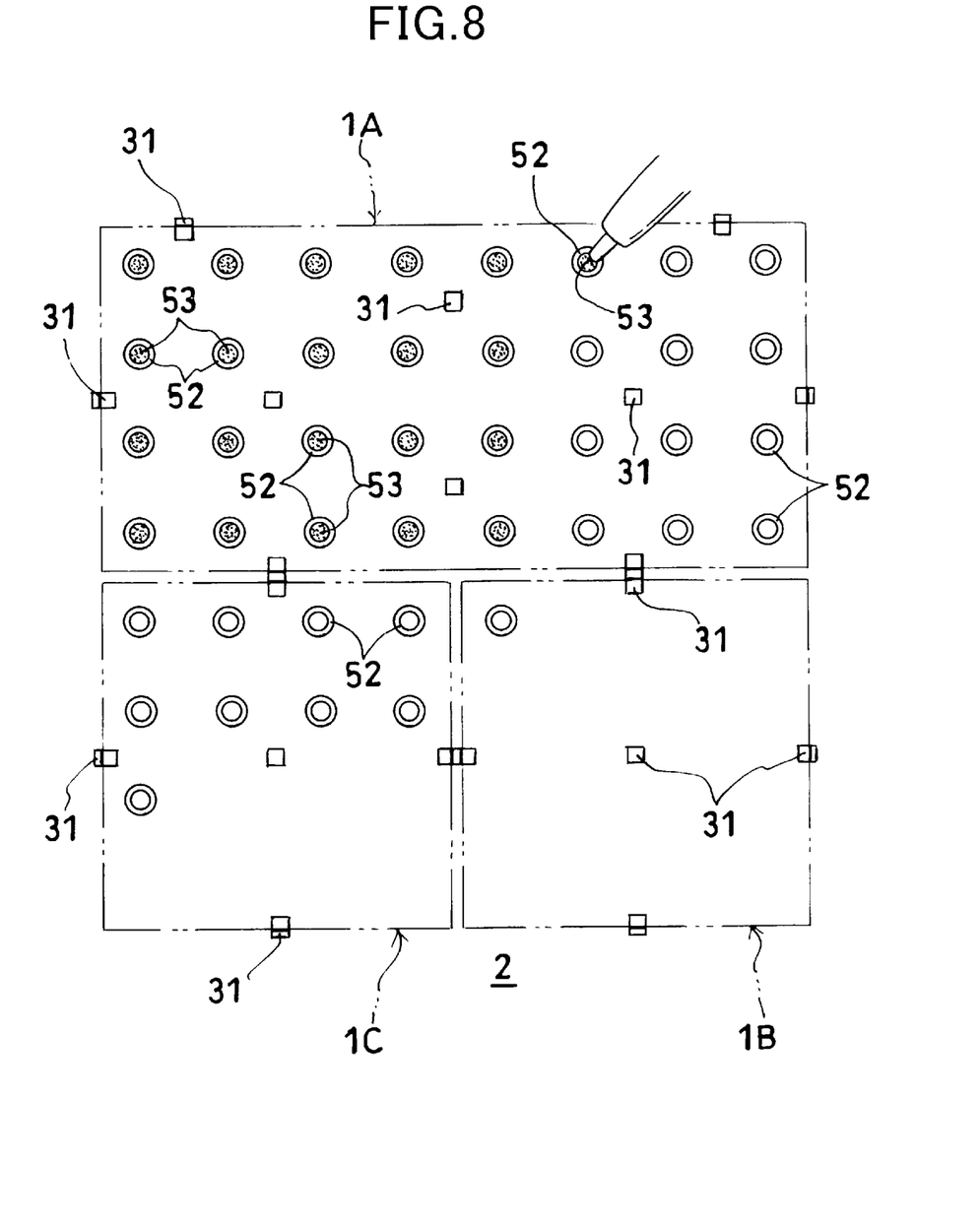
FIG. 8 is a plan view of a floor bed during construction of a stainless-steel floor in accordance with a third embodiment.

FIG. 8 is a drawing of the floor bed during construction of a stainless-steel floor according to the third embodiment; FIG. 9 shows an adhesive being applied to the floor bed; and FIG. 10 is a vertical cross-sectional view of the stainless-steel floor thus constructed. Parts and elements that are the same as those of the first embodiment have been given the same reference numerals, and further explanation thereof is omitted.

Before laying the stainless-steel plates 1A, 1B and 1C, as shown in FIG. 8, support members 31 are affixed to the floor bed 2 and aligned to receive the plates 1A to 1C thereon. Leakage-prevention members 52 are disposed at appropriate points on the floor bed 2. The leakage-prevention members 52 can be constituted of sponge rings or the like. Then, as shown in FIG. 9, an adhesive 53 is injected into the inside part of each leakage-prevention member 52. The leakage-prevention members 52 are made slightly higher than the support members 31, so that the center of the members 52 can be filled with the adhesive 53 without the adhesive leaking out.

The stainless-steel plates 1A, 1B and 1C are then placed in position on the support members 31. The plates 1A, 1B and 1C are thus maintained at a set height by the support members 31. The leakage-prevention members 52 and the adhesive 53 are deformed to the height of the support members 31 by the downward pressure of the plates 1A, 1B and 1C. This causes horizontal spreading of the adhesive 53, which is constrained by the leakage-prevention members 52. Thus, as shown in FIG. 10, the adhesive 53 sets with the leakage-prevention members 52 bulging outwards, bonding the plates 1A, 1B and 1C to the floor bed 2. The seams between the stainless-steel plates are then caulked, to thereby complete the stainless-steel floor.

In this way, as in the case of the first embodiment, the stainless-steel plates 1A, 1B and 1C are bonded to the floor bed 2, enabling the strength of the floor to be maintained even if the thickness of the stainless-steel plates is reduced. This makes it possible to reduce the amount of stainless steel used in the floor, and therefore to reduce the cost of the floor. Also, seams between plates are caulked, providing good waterproof properties, unlike in the case of conventional stainless-steel plate floors in which water can leak between the welds used to join plates together. The adhesive 53 can be provided together with the leakage-prevention members 52, and then the stainless-steel plates 1A, 1B and 1C only have to be laid in position to be bonded to the floor bed 2. Since there is no need to use mortar, the construction of the stainless-steel floor is further simplified. Since, therefore, the need to use a hose 6 or hose nozzle 6a is eliminated, the height of the support members 31 can be decreased, making it possible to further lower the height of the stainless-steel floor.

The present invention configured as described in the foregoing provides the following effects.

The stainless-steel plates are bonded to the floor bed, so the plates can be made thinner while still maintaining the requisite floor strength. This makes it possible to reduce the amount of stainless steel used to construct the floor, lowering the cost of the floor. Also, the support members have to be higher than the diameter of the hose disposed along the floor bed to pump in the mortar. However, in the case of this invention the hose is placed in a groove, which makes it possible to decrease the height of the support members. This enables the floor height to be reduced, so even when there is an existing limit on the floor height, such as when the floor is being built as part of an interior renovation, it is still possible to build a stainless-steel floor without doors catching on the floor.

The hose is inserted from one short side up to the other and is gradually withdrawn as the mortar is pumped in, driving out air in the space. This ensures the strength of the stainless-steel floor by preventing voids in the mortar. Gaps between the stainless-steel plates are caulked, making the floor waterproof, in contrast to the conventional construction method in which the plates are welded together, which allows water to leak through between the welds.

Using a downward-pointing nozzle makes it possible to further decrease the height of the floor, since it is not necessary for the space between the plates and the bed to be greater than the diameter of the hose. The nozzle also simplifies the construction of the floor, since the nozzle only has to be pointed under the plates. With openings being provided in the leakage-prevention member, enough mortar can be provided by inserting the nozzle between the plates or into the openings, again ensuring the strength of the floor by preventing voids in the mortar.

The stainless-steel plates can also be bonded to the bed by using an adhesive provided in leakage-prevention members, in which case it is only necessary to place the plates in position on the support members for the bonding to be attained. Since this eliminates the need to use mortar, and hence the need to use a hose, the floor height can be further reduced by decreasing the height of the support members.

What is claimed is:

1. A stainless-steel floor, comprising:
   a plurality of support members located on a floor bed;
   a stainless-steel plate comprising a boxed-shaped body having one end thereof open and concrete poured therein laid on the support members; and
   a material inserted into a space formed between the floor bed and the stainless-steel plate, which bonds the stainless-steel plate to the floor bed.

2. The floor according to claim 1, wherein the material that bonds the stainless-steel plate to the floor bed is filler material supplied from a hose disposed between the stainless-steel plate and the floor bed.

3. The floor according to claim 2, wherein the floor bed has a groove into which the hose is inserted.

4. The floor according to claim 1, wherein the material that bonds the stainless-steel plate to the floor bed is an adhesive enclosed by spreading-prevention members.

* * * * *